United States Patent Office

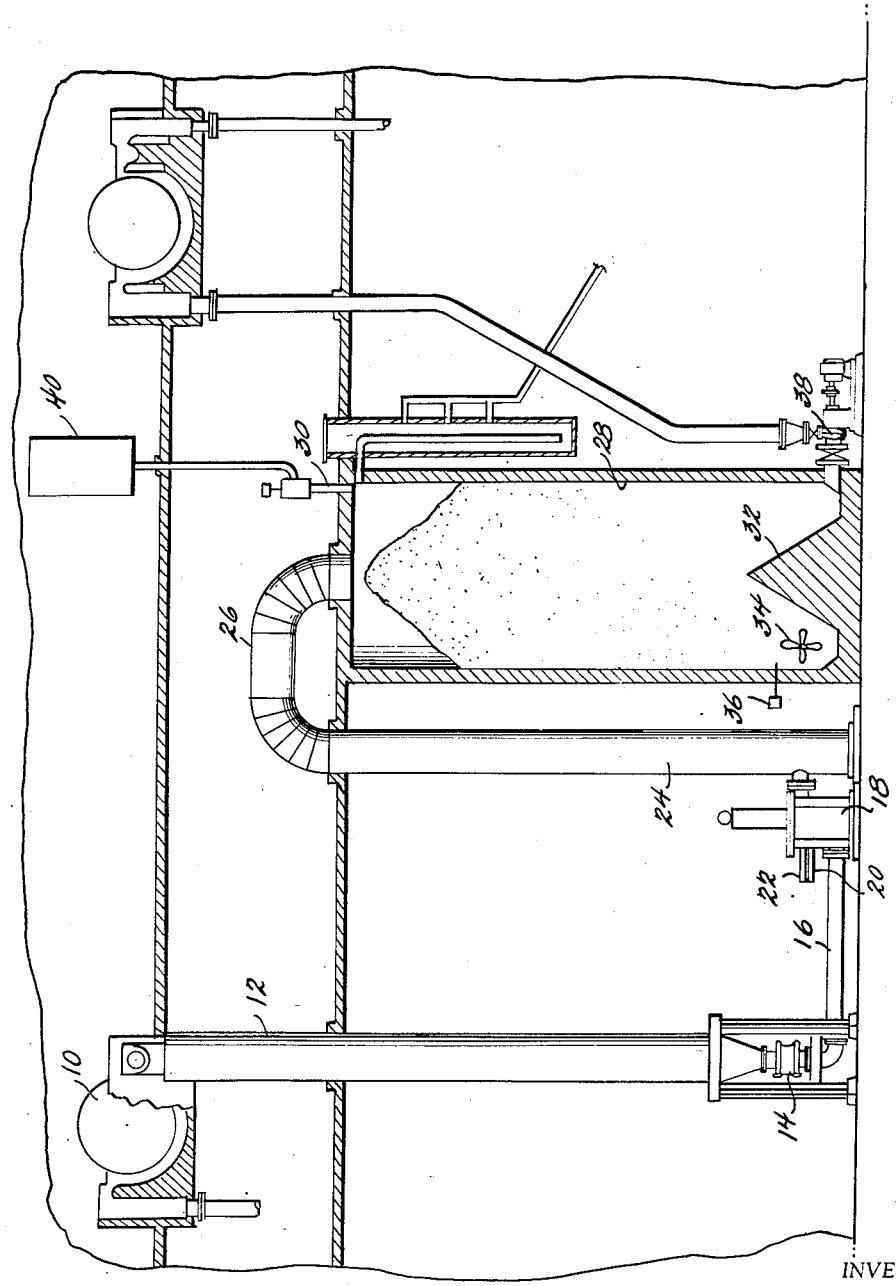

2,706,673
Patented Apr. 19, 1955

2,706,673

METHOD OF BLEACHING WITH CHLORINE DIOXIDE

Elmer R. Burling and John P. Rich, Nashua, N. H.

Application October 19, 1951, Serial No. 252,121

1 Claim. (Cl. 8—156)

It is an object of this invention to provide a method and apparatus for the use of chlorine dioxide in the bleaching of wood pulp.

Until the present invention everyone has considered that it was impossible to obtain a complete bleach with chlorine dioxide in acid solution without breaking the treatment into several stages with caustic washing between the stages. We have discovered that contrary to this general belief ligneous matter can be completely removed in a single treatment with chlorine dioxide at an acid pH. The advantages of chlorine dioxide bleaching have long been recognized. Chlorine dioxide has a greater oxidative affinity for lignin than it has for cellulose and so long as it is in acid solution it will not significantly impair or degrade the quality of pulp. In acid solution it has heretofore been considered subject to a barrier or blocking effect similar to that encountered in bleaching with elementary chlorine.

In the annexed drawing the components of the apparatus are schematically illustrated.

A pulp thickener 10 delivers pulp to a compacting tower 12 at a consistency approximating 17 percent air-dried solids. The compacting tower obviously forms a reservoir but it has the further function of providing a high intake head on the thick stock pump Pulp at 17 percent consistency is difficult to pump in any case and the provision of a high intake head greatly improves this operation. From the base of the tower a thick stock pump 14, such, for example as is shown in Patent No. 2,460,278, forces the stock through a line 16 to a mixer 18. The length and diameter of the line 16 are so calculated that the stock in the line forms a plug preventing any back feeding of reagent from the mixer 18. A line 20 supplies a solution of chlorine dioxide in water and a line 22 supplies steam to the mixer 18. The steam line, in the alternative, may go to the tower 12 where it acts as a pre-heater, or to the tower 24 or, in some instances, it may be divided between any two or all three of the points mentioned. The dissolved chlorine dioxide is present in a concentration approximating 6 grams per liter and at that concentration will have a pH approximating 3. This concentration and pH while preferable are not critical. The upper limit on chlorine dioxide concentration is fixed as will be discussed hereinafter by the limiting permissible vapor pressure of chlorine dioxide. The steam and the chlorine dioxide solution dilute the pulp to a consistency of approximately 12 percent air-dried solids. From the mixer 18 the stock flows to the base of a column 24 which communicates, through a connection 26, with the top of a secondary reaction tower 28.

The steam should be sufficient to raise the temperature of the mixture to between 140 and 185 degrees F., and preferably at 160 degrees F. If desired, steam can be used to heat gradually the stock in the compacting tower 12, in which case only chlorine dioxide water is added at the mixer. One advantage of heating the stock as it progresses through the compacting tower 12 is to bring the stock to a uniform temperature, thereby avoiding local hot spots which might cause local high vapor pressure of chlorine dioxide when the chlorine dioxide solution contacts the pulp. In addition, steam may be added to column 24 after sufficient chlorine dioxide has reacted.

The column of stock in the primary reaction tower 24 provides a static head on the mixer. The head effective at the base of the tower 24 is the static head due to the height of the tower plus the friction head of the advancing pulp. This should not be less than 10 p. s. i. (pounds per square inch). This is of the greatest importance. Chlorine dioxide has an explosive tendency even when mixed with other gases. If, however, the mixture of gases is such that the vapor pressure of the chlorine dioxide does not exceed about 10 percent of the total pressure of the mixture it is perfectly safe. Accordingly, the most rapid mixing of the chlorine dioxide water with the pulp and water mixture is desirable to reduce as quickly as possible concentration of chlorine dioxide in water solution and hence to lower its relative vapor pressure.

At the top of the tower 28 a line 30 is used to maintain substantially a constant static head. It is essential that this be a positive pressure since, when the stock drops from the line 26 into the tower 28, there is an opportunity for the evolution of unconsumed chlorine dioxide and the volume at the top of the tower represents a possible zone for explosion. By maintaining a positive pressure at the top of the tower the percentage of such pressure made up by chlorine dioxide is lower.

A cross-sectional area of the secondary reaction tower 28 is from 10 to 20 and preferably about 16 times the cross-sectional area of the primary reaction tower 24 which means that stock is in transit in the secondary reaction tower about 16 times as long as it is in the primary reaction tower.

At the base of the secondary reaction tower there is a conical formation 32 and several tangentially directed propellers 34 serve to circulate the stock around the cone. This is a well known construction. One or more inlet pipes 36 serve to dilute the stock and such dilution should be accomplished by a solution of sulphur dioxide or other reagent which will serve to neutralize any residual chlorine dioxide. The dilute stock is removed from the base of the tower by a pump 38.

It is to be noted that no active chlorine dioxide is in the system except in the mixer and the two reaction towers. Thus the possibility of corrosion is limited to those towers and it is not necessary to resort to expensive corrosion-resistant materials in the rest of the system.

Chlorine dioxide is not particularly soluble but it is very much more so than air. Obviously the gas mixture at the top of the secondary reaction tower 28 will be largely air, chlorine dioxide and water vapor, with small amounts of other gases. It is desirable to bleed these gases from the top of the secondary reaction tower 28 through the line 30 and the gases thus bled are passed to a cooler 40 which condenses the moisture in the bled-out gas. This condensate dissolves very little air but does dissolve considerable of the chlorine dioxide and the solution may be returned to the chlorine dioxide system. The remaining gas may be discharged to atmosphere and its corrosive effect will have been greatly diminished by the solution of the chlorine dioxide in condensate. In order to maintain a positive, super atmospheric pressure in the top of tower 28 at all times, air may be added at the stock pump 14 to provide always a supply of gas for the bleeder which can then operate on a maximum pressure limitation basis.

It is to be noted that as the pulp rises in the primary reaction tower 24 the pressure continually decreases but as the stock moves down through the secondary reaction tower 28 the pressure constantly increases until, at the base of the secondary tower 28 the pressure approximates the static head at the base of the primary tower 24. This treatment has been found to completely overcome the so called barrier effect and permits virtually complete exhaustion of the chlorine dioxide thus lowering the consumption of chlorine dioxide for a given degree of bleach. When it is considered that chlorine dioxide costs close to 20 cents a pound this is most important.

Assume that a bleaching effect is desired equivalent to the complete exhaustion of 20 pounds of chlorine dioxide per ton of dried weight pulp. At a consistency of 12 percent there will be 7.33 pounds of liquid per pound of pulp and with 6 grams per liter chlorine dioxide in the initial water solution the concentration at the base of the primary tower will be 1.36 grams per liter. Tests indicate that at the top of the primary reaction tower 80 per cent of the chlorine dioxide has been consumed so that in the free space at the top of the secondary reaction tower and throughout the tower while it is being filled there would be a concentration of .283 grams per liter. This at 160 degrees F. would produce a vapor pressure of only 18 mm. which is eminently safe even at atmospheric pressure.

We claim:

A method of bleaching comprising: mixing an aqueous solution of $ClO_2$ with wood pulp of an initial density approximating 17 percent solids, said solution diluting the mixture to approximately 12 percent solids under a pressure of at least approximately 10 p. s. i.; gradually lowering the pressure to approximately atmospheric, the period of decreasing pressure being such that approximately 80% of the $ClO_2$ has reacted by the time approximately atmospheric pressure is attained, then gradually increasing the pressure to approximately the original pressure, the period of increase in pressure being from approximately 16 to approximately 24 times the period of decreasing pressure and the pH of the mixture ranging between 1.5 and 3.5.

References Cited in the file of this patent

UNITED STATES PATENTS

| | | |
|---|---|---|
| 2,269,667 | Kauffmann | Jan. 13, 1942 |
| 2,280,938 | Vincent | Apr. 28, 1942 |
| 2,513,788 | Day | July 4, 1950 |

FOREIGN PATENTS

| | | |
|---|---|---|
| 621,888 | Great Britain | Apr. 21, 1949 |
| 116,765 | Sweden | July 9, 1946 |
| 191,357 | Great Britain | Mar. 22, 1923 |